United States Patent [19]

Yatomi et al.

[11] 4,366,359

[45] Dec. 28, 1982

[54] WIRE CUT ELECTRIC DISCHARGE MACHINING CONTROL METHOD

[75] Inventors: Takeshi Yatomi; Yutaka Tanaka; Yoshio Ozaki, all of Nagoya, Japan

[73] Assignee: Mitsubishi Denki Kabushiki Kaisha, Tokyo, Japan

[21] Appl. No.: 186,842

[22] Filed: Sep. 15, 1980

[30] Foreign Application Priority Data

Sep. 27, 1979 [JP] Japan .................. 54-124458

[51] Int. Cl.³ ............................................. B23P 1/08
[52] U.S. Cl. .............................. 219/69 M; 219/69 W
[58] Field of Search ......................... 219/69 W, 69 M

[56] References Cited

U.S. PATENT DOCUMENTS 4,052,583 10/1977 Inoue ............................. 219/69 W

FOREIGN PATENT DOCUMENTS 46-13707 4/1971 Japan .
51-150796 12/1976 Japan .
54-13096 1/1979 Japan ................................ 219/69 W

*Primary Examiner*—C. C. Shaw
*Attorney, Agent, or Firm*—Oblon, Fisher, Spivak, McClelland & Maier

[57] ABSTRACT

A command average machining current It(n) corresponding to change of a workpiece thickness is given by the following equations:

$$Ia(n) = 0.228 + 0.07 Fn \cdot Tn^{1.16}$$

$$S(o) = \left(0.249 + \frac{9.7 \times 10^{-3}}{Ia(o) - 0.189}\right) \cdot To^{0.05}$$

$$\overline{I}t(n) = 0.189 + \frac{9.7 \times 10^{-3}}{S(o)Tn^{-0.05} - 0.249}$$

wherein the reference $\overline{I}a(n)$ designates an actual average machining current $\overline{I}a(n)$ at the workpiece thickness (Tn); $\overline{I}t(n)$ designates an average machining current of the control command; Fn designates an actual machining feed rate; $\overline{I}a(o)$ designates an actual average machining current at the initiation of the machining; S(o) designates a machining width; and To designates a workpiece thickness.

The command average machining current It(n) is compared with the actual average machining current and the electric condition is changed and controlled to approach the actual average machining current to the command average machining current It(n) thereby controlling the work groove width to be constant in an electric discharge machining of the workpiece with a wire electrode.

12 Claims, 16 Drawing Figures

WIRE CUT ELECTRIC DISCHARGE MACHINING CONTROL METHOD

BACKGROUND OF THE INVENTION

1. Field of the Invention

The present invention relates to an electric discharge machining using a wire cut type electrode to control a work groove width (a width of cut or a machined groove width) by controlling a work current so as to improve the accuracy of the work.

2. Description of the Prior Art

Figure 1:
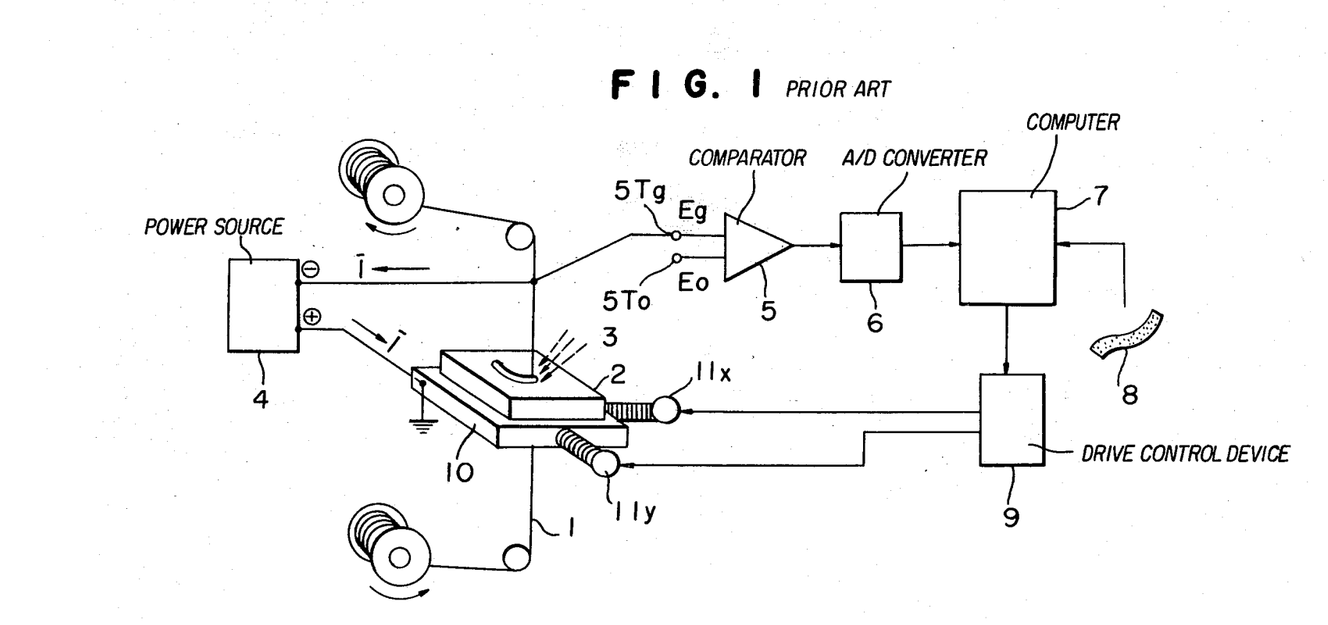
FIG. 1 is a schematic view of a conventional wire cut electric discharge machine.

As shown in FIG. 1, the conventional wire cut electric discharge machine usually uses a wire electrode (1) having a diameter of 0.05 to 0.3 mm made of copper, brass or tungsten. The electric discharge is repeated by the pulse current fed from the work power source (4) at a minute gap between the wire electrode (1) and a workpiece (2) on a table (10) moved in the X-direction and Y-direction under a flow of work liquid (3) (usually deionized water passed through an ionexchange resin).

The control of the relative movement of the wire electrode (1) and the workpiece and (2) to the work direction will be illustrated.

The average voltage between the electrodes (Eg) detected during the machining is compared to a reference voltage (Eo) by a comparator (5) by applying the voltages to the input terminals (5Tg), (5To) of the comparator (5). The analog output voltage of the comparator, which is (5) proportional to the difference between the voltages (Eg), (Eo) is applied to an A/D converter wherein the analog output voltage is converted into the corresponding digital data signal. The digital data signal is fed into a computer (7). On the basis of the input digit data signal and a move command ($\Delta X$, $\Delta Y$) given by an N/C tape (8), the computer calculates a machining feed rate $$F = \sqrt{V_x^2 + V_y^2}$$

and speeds $V_x$, $V_y$ for moving the X-Y cross table (10) in the X-direction and Y-direction. The signal corresponding to the calculated feed rates $V_x$, $V_y$ is fed into a drive control device (9).

The cross table (10) is shifted in the X-direction and Y-direction by a motor ($11_x$) for X-axis and a motor ($11_y$) for Y-axis which are controlled by the drive control device (9). The machining feed rate is controlled so that the average voltage between electrodes (Eg) remains constant $$(Eg-Eo \approx 0).$$

In the conventional method, the pulse voltage of the work power source (4) (current peak value, pulse width and dwell) and the non-load voltage are not usually varied. Therefore, the average machining current (I) flowing between wire electrode (1) and workpiece (2) from the work power source (4) does not vary under normal conditions.

Figure 2:
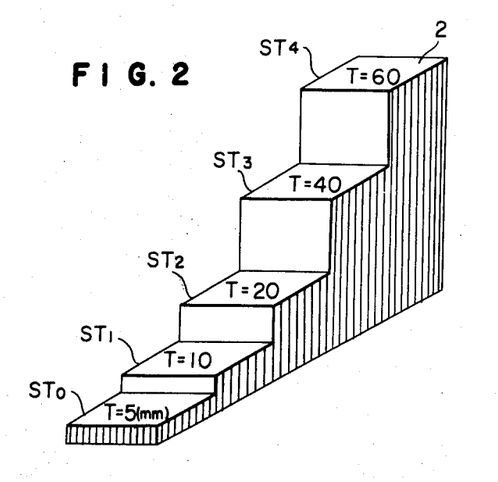
FIG. 2 shows a configuration of a workpiece used for experiments with this invention.

The inventors have studied by experiments, the machining feed rate and the work groove width etc. in the machining process when which the thickness of the workpiece (2) which is stepwise varied as shown in FIG. 2 by steps by the control method using a conventional electric discharge machine shown in FIG. 1. In FIG. 2, the reference ST0 designates a first step part having a thickness (T) of 5 mm; ST1 designates a second step part having a thickness of 10 mm; ST2 designates a third step part having a thickness of 20 mm; ST3 designates a fourth step part having a thickness of 40 mm; and ST4 designates a fifth step part having a thickness of 60 mm.

Figure 3:
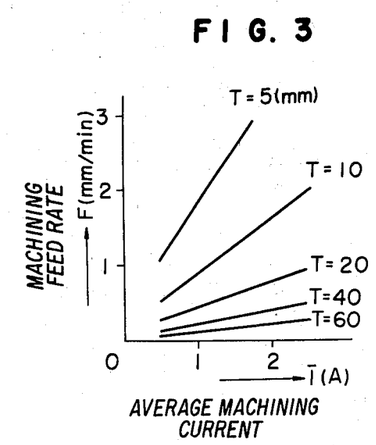
FIGS. 3, 4 and 5 are graphs showing the results of machining the workpiece using the conventional method.

FIG. 3 is a graph showing the relation of the machining feed rate (F) and the average machining current ($\bar{I}$) using the thickness of the workpiece as a parameter. It is understood from FIG. 3, that the machining feed rate (F) is in proportional to the average machining current ($\bar{I}$) in all of the steps regardless of the thickness (T) of the workpiece.

Figure 4:
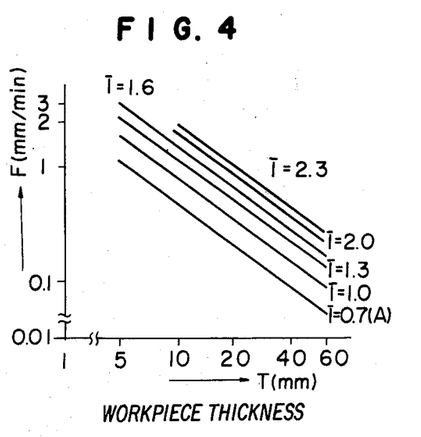

FIG. 4 is a graph in logarithmic scales showing the relation of the machining feed rate (F) and the thickness (T) of the workpiece using the average machining current ($\bar{I}$) as a parameter.

It is understood, from FIG. 4, that the feed rate (F) is linearly reduced depending upon the thickness (T) of the workpiece regardless of the average machining current (I). When an empirical formula of the machining feed rate (F) is obtained from FIG. 4, it will be as follows:

$$F = 14.3(\bar{I} - 0.228) \cdot T^{-1.16} \tag{1}$$

F: machining feed rate (mm/min)
$\bar{I}$: average machining current (A)
T: workpiece thickness (mm)

If formula ($\bar{I}$) is rearranged, the following is obtained.

$$\bar{I} = 0.228 + 0.07 F \cdot T^{1.16} \tag{2}$$

If the machining feed rate (F) during machining and the workpiece thickness (T) can be obtained from Formula (2), the value of average machining current ($\bar{I}$) during machining can be readily calculated.

Figure 5:
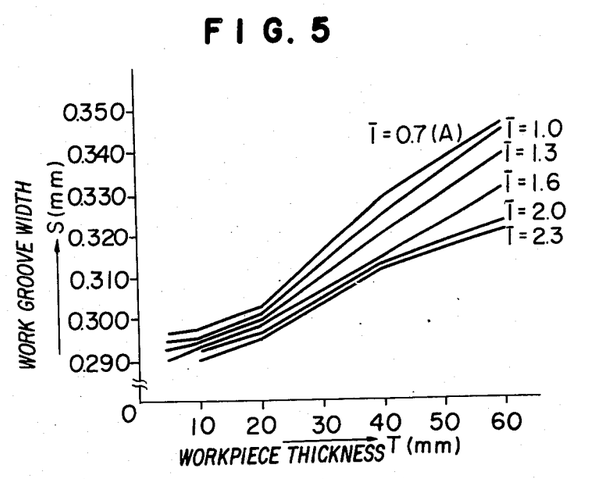

FIG. 5 shows the relation between the work groove width (S) and workpiece thickness (T) uner the conditions in FIG. 4 using average machining current ($\bar{I}$) as a parameter. If workpiece thickness (T) stepwise varies from 5 to 60 mm in the conventional machining method, the work groove width increases about 50 μm at most as workpiece thickness (T) increases. Accordingly, as shown in FIG. 5, when the thickness of workpiece (2) increases in the order of t1→t2→t3→t4(t1<t2<t3<t4), the work groove width increases S1→S2→S3→S4(S1<S2<S3<S4).

The relations of t1 to t4 are given by t1<t2<t3<t4 and the relations of S1 to S4 are given by S1<S2<S3<S4.

Figures 6A, 6B:
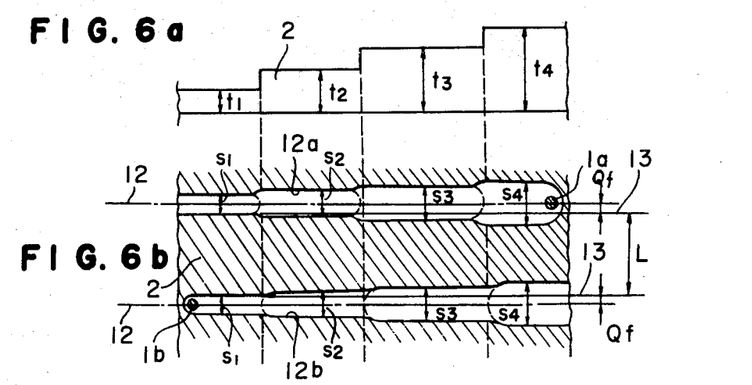
FIG. 6 shows views for illustrating effects of changes of the workpiece groove width to dimentional accuracy.

FIGS. 6a and 6b show phenomena increasing the work groove width depending upon the increase of the workpiece thickness. FIG. 6a is a side view and FIG. 6b is a plane view. In FIGS. 6a and 6b, the reference (12a) designates a work groove formed by machining in the forward movement and (12b) designates a work groove formed in the returning movement.

As shown in FIG. 6b, generally, the wire electrode (1) is selected by shifting by a half of the work groove width value S1 as offset (Qf) relative to contour line (13) of the desired form as the wire path (12). (In this case, a half of work groove width S1 is used as an offset amount at thickness of t1.) As is clear from the figures, an overcut will occur at the inside of contour line (13) with an increase of thickness. In order to obtain a workpiece having thicknesses L shown in FIG. 6b, it is necessary to reciprocally move the wire electrode (1) to form a pair of the work grooves (12a), (12b). Therefore, the error in the reciprocal machining is double that of one-way machining, which deteriorates the accuracy.

Figures 7A, 7B:
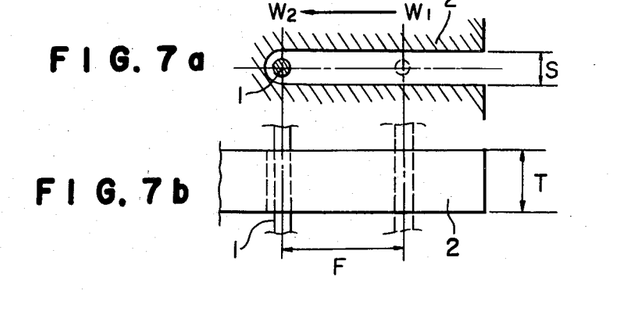
FIGS. 7 and 8 show machining volumes which are determined by calculation.
Figure 8:
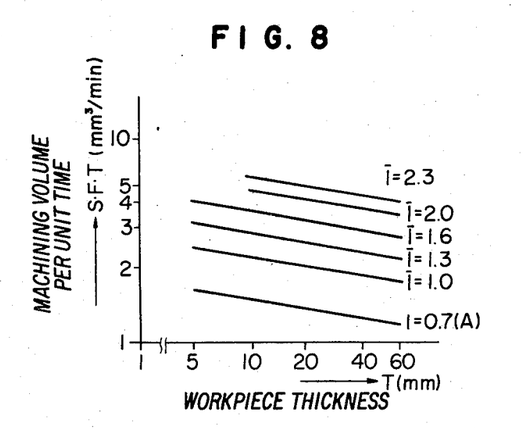

In order to describe these phenomena 3-dimensionally, referring to FIG. 7a of the plane view and FIG. 7b of the side view, the machining volume when the wire electrode (1) advances from W1 to W2 in a unit time (1 minute in the experiment) will be illustrated. As is understood, the machining volume is expressed by the product of 3 factors: the work groove width (S), the forward movement (F) per unit time and the thickness (T) of the workpiece (2). FIG. 8 shows the relation of the product to the workpiece thickness (T) as plotted on the logarithmic paper using the average machining current as a parameter. According to this figure, the machining volume (S.F.T) per unit time decreases rectilinearly as the workpiece thickness increases; that is, the current efficiency drops. If an empirical formula of the work groove width (S) is obtained from FIG. 8, it will be as follows.

$$S = 3.56(\overline{I} - 0.189) \cdot T^{-1.11} \cdot F^{-1} \quad (3)$$

If formula (1) is substituted into formula (3), the following will be obtained.

$$S = \left(0.249 + \frac{9.7 \times 10^{-3}}{\overline{I} - 0.189}\right) \cdot T^{0.05} \quad (4)$$

If formula (4) is rearranged, the following will be obtained.

$$\overline{I} = 0.189 + \frac{9.7 \times 10^{-3}}{S \cdot T^{-0.05} - 0.249} \quad (5)$$

Formula (5) suggests that the average machining current I, when the work groove width (S) is kept constant depending upon the workpiece thickness, can be obtained by calculation. The diameter of the wire electrode used for this experiment was 0.2 mm in all the tests. As is disclosed from the result of the experiment, with the conventional machining method the change in the work groove width when the workpiece thickness varies is considerably large as is clear from FIG. 5, which causes the work accuracy to be lower and cause a serious problem. In view of the problems described so far, the persent invention is to provide a method of controlling to give the constant work groove width regardless of the variation in workpiece thickness during the machining, by employing the empirical formula derived from the results of the experiment and thereby improve the work accuracy.

SUMMARY OF THE INVENTION

It is an object of the present invention to provide a wire cut electric discharge machining control method which improves machining characteristics by controlling the factors contributing to an average machining current.

The foregoing and other objects of the present invention have been attained by providing a wire cut electric discharge machining control method by repeating the electric discharge at a minute gap between a wire electrode and a workpiece with a work solution as a dielectric medium by a work power source and by controlling a relative movement between the wire electrode and the workpiece wherein the machining current is changed and controlled to control a work groove width to the command width.

DETAILED DESCRIPTION OF THE PREFERRED EMBODIMENTS

An embodiment regarding the control method of this invention will be described below.

Figure 9:
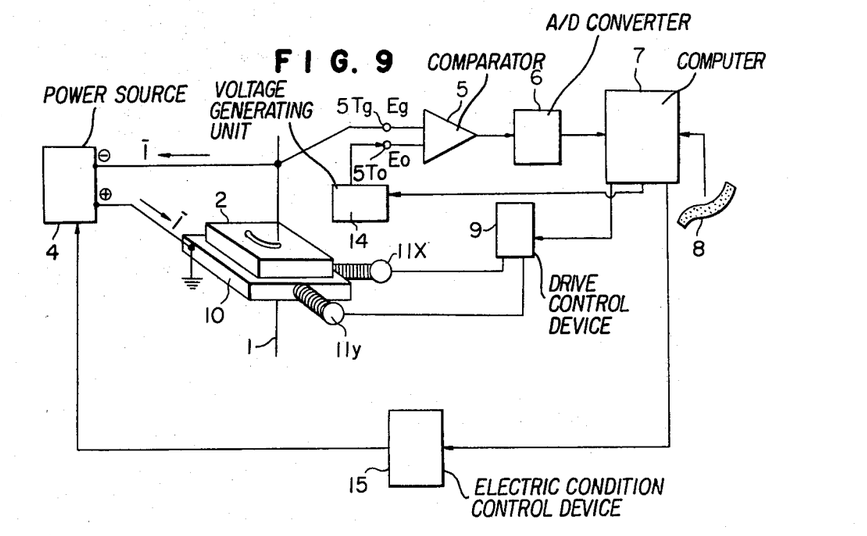
FIG. 9 is a schematic view of the electric discharge machine used for the control method of this invention.

FIG. 9 shows a schematic view of one embodiment of the electric discharge machine used for the method of the present invention.

In FIG. 9, the references (1) to (11) designates the same parts shown in FIG. 1; (14) designates a voltage generating circuit which receives the signal from the computer (7) and applies the voltage output to the input terminals (5To) of the comparator (5); (15) designates an electric condition control device which receives the signal from the computer (7) and applies the output to the work power source (4). The control method of the relative movement of wire electrode (1) and the workpiece shown in FIG. 9 is the same method of controlling the average voltage between electrodes (Eg) to be constant (Eg−Eo≈0) as described with FIG. 1. Therefore, a description of this method is omitted. It should be noted that reference voltage (Eo) as in FIG. 1 is normally set by a circuit composed of hardware and when it is to be changed from outside, generally a knob for setting is used which is operated manually. Opposed to such a method, with the embodiment of this invention, before machining, reference voltage (Eo) is input in a digital signal to computer (7) manually with digital switches for setting and computer (7) issues commands from input data to voltage generating circuit (14) depending upon the input data, where reference voltage (Eo) is generated by the circuit (14).

Description will be made of a method to control the work groove width (S) to be constant.

Regarding the controlling principle, the said empirical formulae shown below are stored depending upon the formulae (2), (4), (8) in the computer (7) as in FIG. 9.

$$\overline{Ia}(n) = 0.228 + 0.07Fn \cdot Tn^{1.16} \quad (2')$$

$$S(o) = \left(0.249 + \frac{9.7 \times 10^{-3}}{\bar{I}a(o) - 0.189}\right) \cdot T_o^{0.05} \quad (4')$$

$$\bar{I}t(n) = 0.189 + \frac{9.7 \times 10^{-3}}{S(o) \cdot Tn^{-0.05} - 0.249} \quad (5')$$

Where $\bar{I}a(n)$: Actual average machining current at the workpiece thickness (Tn);

$\bar{I}t(n)$: Average machining current which is the command control value at the workpiece thickness (Tn) at the initiation of the machining;

S(o): Work groove width at workpiece thickness (To);

Fn: Actual machining feed rate at the moment at the workpiece thickness (Tn);

To: Workpiece thickness at the initiation of machining;

$\bar{I}a(o)$: Actual average machining current at the initiation of the machining.

Before starting machining, the operator inputs into computer (7) the initial thickness (To) (workpiece thickness of 5 mm in the first step part (STo) shown in FIG. 2) and the desired machining feed rate (Fo) appropriate for the thickness. After machining is started, to obtain the desired machining feed rate, the computer (7) outputs an electric condition command signal to give Fo−F≈F (F: input data from the A/D converter (6)), to the electric condition controller (15). The electric condition of the work power source (4) is altered depending upon the command.

The moment the machining rate actually reaches Fo, the computer (7) outputs a command to fix the electrical condition to electrical condition control device (15). As a result, the electrical condition of the work power source (4) is fixed. This servo of electrical conditions to the machining feed rate (Fo) is well-known in the optimum control of the electrical condition. At this point of in time, the computer (7) calculates $\bar{I}a(o)$ by formula (2') using the input data of the machining feed rate (Fo) and the initial workpiece thickness (To) and also calculates the work groove width S(o) at the initial thickness (To) by formula (4) using $\bar{I}a(o)$ and T(o). Hereafter, the computer (7) controls so as to release the fixed electric condition each time the workpiece thickness is change and to give the electric condition corresponding to the workpiece thickness and to fix the electric condition so that the work groove width is maintained to be S(o).

The control method for the machining when the workpiece thickness is varied from To to T1, that is, as it is increased from the first step part (ST1) to the second step part (ST1) shown in FIG. 2 will be described.

The computer (7) calculates the average machining current $\bar{I}t(1)$ by the formula (5') using the work groove width So for the initial thickness (To) and the thickness change command (T1) in response to a workpiece thickness change command (T1) stored in N/C tape (8). (In advance, the operator inputs into the N/C tape positions or blocks where thickness changes occur. For example, T code: T50 . . . a command to change the thickness to 50 mm). The average machining current $\bar{I}t(1)$ is an average machining current corresponding to the command control current at which the work groove width at thickness T1 of the second step part (ST1) becomes S(o).

The average machining current $\bar{I}a(1)$ just after increasing the thickness for maintaining the constant groove width is calculated by the formula (2') using the actual machining feed rate (F1) at the thickness (T1) of the second step part (ST1) shown in FIG. 2 (input data from the A/D converter (6)) and the thickness (T1) of the first step part (ST1). The computer (7) outputs a command so as to change the electric condition of the work power source (4) so that the average machining current $\bar{I}a(1)$ becomes the average machining current $\bar{I}t(1)$ as the control command, that is, $\bar{I}t(1) - \bar{I}a(1) \approx 0$. Next, when the thickness is changed as T2→T3→T4, the same operation for the change of the thickness as T1→T2 can be carried out. The electric condition is changed to be fixed to each predetermined condition for each change of the thickness.

Namely, the computer (7) is able to know the average machining current at the moment from the machining feed rate by using formula (2). By comparing this current value with the previously calculated command control value ($\bar{I}t(n)$), the computer (7) controls the electrical condition. Hereafter, the electrical condition is controlled by the same method when the workpiece thickness changes.

In this embodiment, the data for the formulae (2), (4) and (5) are all stored in the computer. However, if the initial work groove width can be known in advance by test machining, the operator calculates $\bar{I}t(n)$ by himself by the formula (5) in advance and inputs an average machining current command as well as a thickness change command into N/C tape. If this is done, the formulae (4) and (5) need not be stored except for the formula (2'). This will greatly reduce the time for arithmetic operation. If a shunt resistance (R) is put in series between electrodes and voltage, $V_R(=\bar{I}a(n)\cdot R)$ is determined by measuring it across the resistance, the actual average machining current $\bar{I}a(n)$ for the workpiece thickness (Tn) can be found by $V_R/R$ using the measured voltage. If the control is made by this method, formula (2') also need not be stored.

Figure 10:
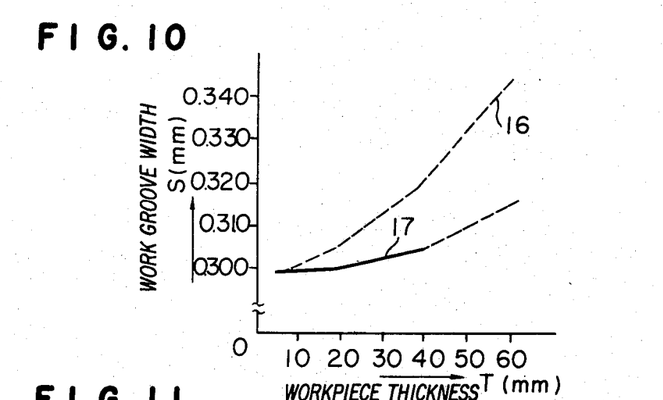
FIGS. 10 and 11 are graphs showing the result of the machining of the workpiece according to the method of this invention and the conventional method.
Figure 11:
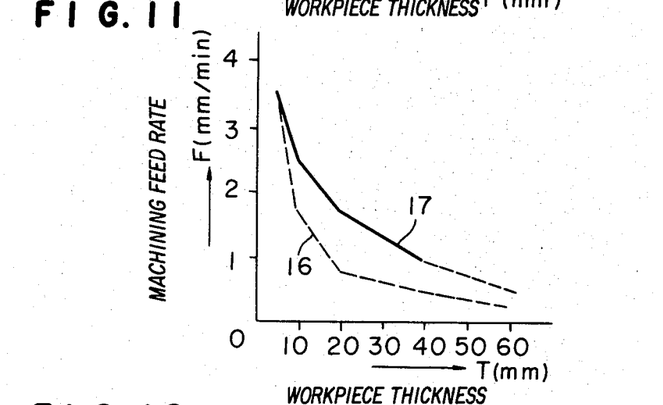

FIGS. 10 and 11 show the results of machining a workpiece of the form shown in FIG. 2 by respectively using the conventional method and the method of this embodiment of the invention.

FIG. 10 shows the relation between the workpiece thickness (T) and the work groove width (S) and FIG. 11 shows the relation between the workpiece thickness (T) and the machining feed rate (F). In FIGS. 10 and 11, the reference (16) designates data for the relation in the conventional method and (17) designates data for the relation in the embodiment of the present invention.

Figure 12:
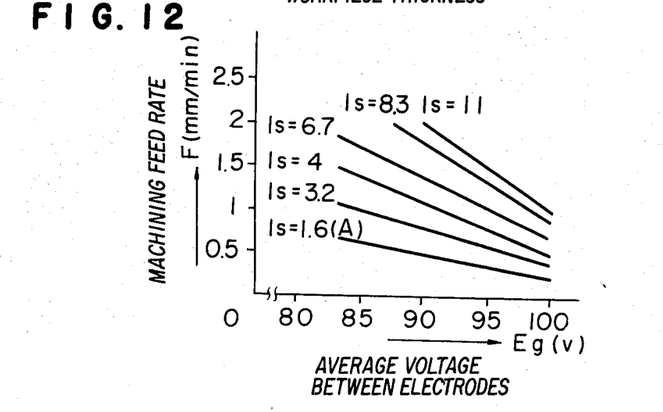
FIGS. 12 and 13 are graphs showing characteristics of factors contributing for the average machining current.
Figure 13:
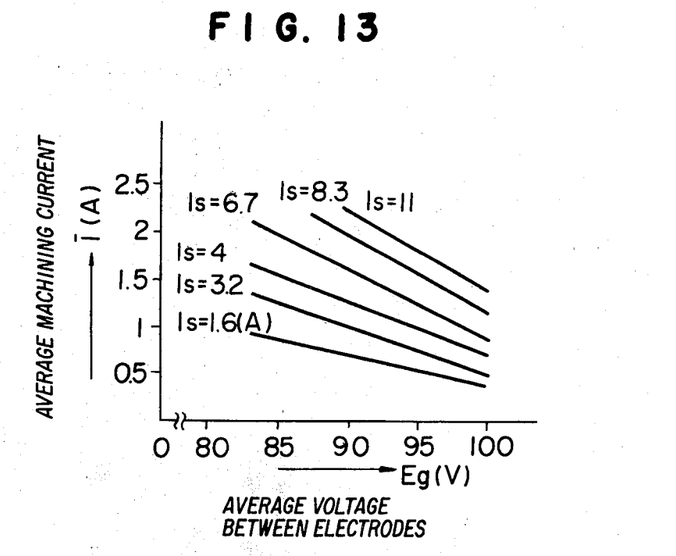

It is understood from these figures that both the work groove width and machining feed speed have improved remarkably. However, in this embodiment of the invention, there is a portion of $\bar{I}t(60) > \bar{I}a(60)$ as indicated with broken lines. This is because there were limitations on the electrical condition of the work power source and it was impossible to increase $\bar{I}a(60)$. It means that the actual average machining current is not enough for a workpiece thickness of 60 mm. Consequently, for the electrical condition in this embodiment of the invention, the peak current (Ip), pulse width ($\tau$on) and halt time ($\tau$off) of a square wave were used. It was necessary to compensate for the inadequate amount of the average machining current using another parameter. FIGS. 12 and 13 show the results of the experiments from the different viewpoints.

FIG. 12 shows the relation between the machining feed rate (F) and the average voltage between electrodes (Eg) and FIG. 13 shows the relation between the average machining current ($\bar{I}$) and the average voltage for electrodes (Eg) as expressed using the short-circuit current (Is) (current in short-circuit of the electrode (1) and the workpiece (2)) as a parameter. The short-circuit current (Is) is expressed by the following formula $$Is = \frac{Ip \cdot \tau on}{\tau on + \tau off}$$

As is understood from these figures, as the average voltage between electrodes (Eg) decreases, the machining feed rate (F) increases and also the average machining current ($\bar{I}$) increases. In the light of this fact, if the said average voltage between electrodes (Eg) is combined in this embodiment of the invention, the said shortage of the average machining current can be compensated. Namely, according to the embodiment shown in FIG. 9, when changing the workpiece thickness, by making computer (7) output a command signal for the voltage between electrodes (Et(n)) lower than the initial average voltage between electrodes (Eo) to voltage generating circuit (14), the average voltage between electrodes can be reduced.

In the conventional machining control method, the average voltage between electrodes is controlled to be constant from the beginning to the last.

Figure 14:
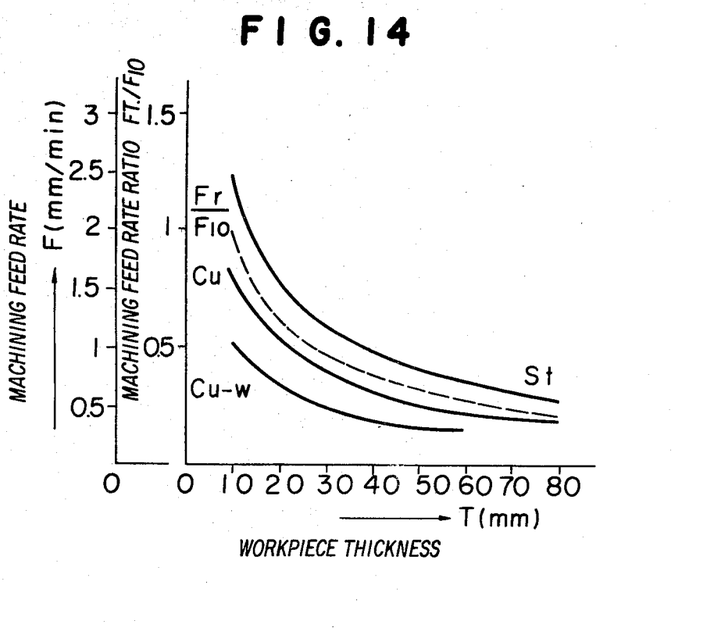
FIG. 14 is a graph showing another embodiment.

FIG. 14 shows the relation between the machining feed rate (F) and the machining feed rate ratio (FT/F10) to the workpiece thickness (T) as expressed using the type of material of the workpiece as a parameter. The machining feed rate ratio is the quotient obtained by dividing the machining feed rate (FT) at a thickness of a workpiece by the machining feed rate (F10) at the workpiece thickness of 10 mm. According to the FIG. 14, the machining feed rate (F) decreases depending upon the increase of the thickness (T) in the case of any of iron, copper and copper-tungsten workpieces. It is noteworthy that machining feed rate ratio (FT/F10) of the iron, copper and copper-tungsten workpieces is expressed with one curve. This is significant.

To consider another embodiment of the invention with emphasis on this fact, if the machining feed rate command is output according to the said curve of FT/F10 at the change of the thickness of the workpiece, the computer will output the electrical condition command so that the commanded machining feed rate is achieved. If an increase of the work groove width due to the shortage of the average machining current occurs, the shortage of the average machining current can be compensated by increasing the average machining current through formulae (2), (4) and (5) or by shifting the curve of FT/F10 in the direction in which the machining feed rate ratio for each workpiece thickness increases (upward in FIG. 14). Besides the electrical condition control used in this invention in order to increase the average machining current greatly, it is of course possible to control the electrical condition by combining a no-load voltage or a capacitance as a part of the power source, etc.

In short, in this invention, in order to prevent the lowering of the machining accuracy and rate with the changes in workpiece thickness, the average machining current which is related to both of them is formulated as a function of the work groove width, the machining feed rate and the workpiece thickness, whereby the factors contributing to the average machining current is changed and controlled to realize an improvement in the machining characteristics. If the electrical condition is controlled continuously (not fixed) regardless of changes in workpiece thickness, this control method can be used even though the workpiece thickness is constant and the machining at a high accuracy can be expected to be achieved. As mentioned in the other embodiment of the invention, the said purpose is of course achieved, a method of commanding a machining feed rate, by changing the set value of constant feed rate when the workpiece thickness is changed.

We claim:

1. In an electric discharge machining control method where an electric discharge occurs at a minute gap between a wire electrode and a workpiece, having a work power source and a work liquid as a dielectric medium and controlling relative movement between said electrode and said workpiece, the improvement characterized by changing and controlling a machining current so as to control a work groove width to a command value, wherein the desired machining current at a specific point is determined by the thickness of said workpiece and the machining current at the beginning of the machining operation and the thickness of said workpiece at the specific point, the machining operation being controlled so that the actual machining current approaches the desired machining current thereby providing substantially the same work groove width at the beginning of the machining operation as the work groove width at said specific point.

2. The electric discharge machining control method according to claim 1 wherein said machining current is changed and controlled depending upon a thickness of said workpiece thereby maintaining said work groove width regardless of change of the thickness of said workpiece.

3. The electric discharge machining control method according to claim 1 wherein the change and control of the machining current is performed depending upon a change and control of an electric condition.

4. The electric discharge machining control method according to claim 3 wherein the change and control of the machining current is performed during the machining.

5. The electric discharge machining control method according to claim 1, wherein the change and control of the machining current is performed during the machining.

6. The electric discharge machining control method according to claim 1 wherein the work groove width is controlled by changing and controlling the voltage between electrodes.

7. The electric discharge machining control method according to claim 6 wherein the voltage between electrodes is controlled to compensate for the change in the machining current due to the lowering of the degree of control of the work groove width.

8. The electric discharge machining control method according to claim 1 wherein the work groove width at each specific point is controlled by changing and controlling a ratio of the machining feed rates determined by dividing the machining feed rates at each specific point by the machining feed rates at a predetermined point.

9. The electric discharge machining control method according to claim 8 wherein the ratio of the machining feed rates is controlled to compensate for the change in the machining current due to the lowering of the degree of control of the work groove width.

10. The electric discharge machining control method according to claim 1 wherein the ratio of the machining feed rate determined by dividing the machining feed rate at each specific point by the machining feed rate at the predetermined point and the voltage between the electrodes are controlled in response to the change of the machining current due to the lowering of the degree of control of the work groove width.

11. In an electric discharge machining control method where an electric discharge occurs at a minute gap between a wire electrode and a workpiece, having a work power source and a work liquid is a dielectric medium and controlling relative movement between said electrode and said workpiece, the improvement characterized by changing and controlling a machining current so as to control a work groove width to a command value, wherein the region of said workpiece being machined changes thickness in a stepwise manner and the machining current is changed and controlled by changing and controlling the electric condition before the thickness of said region changes, thereby maintaining substantially the same work groove width before and after the thickness of said region changes.

12. In an electric discharge machining control method where an electric discharge occurs at a minute gap between a wire electrode and a workpiece, having a work power source and a work liquid as a dielectric medium and controlling relative movement between said electrode and said workpiece, the improvement characterized by changing and controlling a machining current so as to control a work groove width to a command value, wherein the controls of the machining current and the work groove width are performed by the following equations (1), (2) and (3):

$$\bar{I}a(n) = 0.228 + 0.07 Fn \cdot Tn^{1.16} \tag{1}$$

$$S(o) = \left(0.249 + \frac{9.7 \times 10^{-3}}{\bar{I}a(o) - 0.189}\right) \cdot To^{0.05} \tag{2}$$

$$\bar{I}t(n) = 0.189 + \frac{9.7 \times 10^{-3}}{S(o) \cdot Tn^{-0.05} - 0.249} \tag{3}$$

Where
$\bar{I}a(n)$: Actual machining current at workpiece thickness (Tn);
$\bar{I}t(n)$: Average machining current which is the target control value at workpiece thickness (Tn);
S(o): Machining groove width at workpiece thickness (To)
Fn: Actual machining feed speed at average workpiece thickness (Tn);
To: Initial workpiece thickness;
wherein the average machining current ($\bar{I}a(n)$) during machining is expressed by equation (1) using workpiece thickness (Tn) and machining feed speed (Fn), machining groove width (So) is expressed by equation (2) using initial workpiece thickness (To) and average machining current Ia(o) at the beginning of machining which are obtained by formula (1) with n=0, and the target value of average machining current ($\bar{I}t(n)$) is calculated by equation (3) so that the machining groove width is So based on equation (2) in subsequent machining and whereby the average machining current ($\bar{I}a(n)$) is altered and controlled based on equations (1) and (3) so that ($\bar{I}t(n) - \bar{I}a(n)$) approximately equals zero.

* * * * *